United States Patent [19]

Myer

[11] Patent Number: 4,767,188
[45] Date of Patent: Aug. 30, 1988

[54] MULTI-DIMENSIONAL NANOMETRIC DISPLACEMENT POSITIONER

[75] Inventor: Jon H. Myer, Woodland Hills, Calif.

[73] Assignee: Hughes Aircraft Company, Los Angeles, Calif.

[21] Appl. No.: 56,556

[22] Filed: May 29, 1987

[51] Int. Cl.$^4$ .............................................. G02B 7/00
[52] U.S. Cl. .................................. 350/320; 350/247; 350/255
[58] Field of Search .................. 350/247, 255, 320; 248/178, 183, 278, 487

[56] References Cited

U.S. PATENT DOCUMENTS

| | | | |
|---|---|---|---|
| 3,407,018 | 10/1968 | Miller | 350/321 |
| 3,436,050 | 4/1969 | Tibbals, Jr. | 248/183 |
| 3,999,841 | 12/1976 | Dakss et al. | 350/320 |
| 4,139,948 | 2/1979 | Tsuchiya | 33/180 R |
| 4,209,233 | 6/1980 | Eisler | 356/321 |
| 4,331,384 | 5/1982 | Eisler | 350/321 |

Primary Examiner—William H. Punter
Attorney, Agent, or Firm—V. D. Duraiswamy; A. W. Karambelas

[57] ABSTRACT

A multi-dimensional nanometric displacement positioner providing a support apparatus for an optical instrument. The positioner apparatus may nanometrically move an optical holder tube through the combined action of a tapered adjustment shaft and a zig-zag double L-shaped arm, which is connected to an optical holder tube support ring by means of a flexure link. Z-axis displacement is achieved when the inner surface of a manually driven outer drive sleeve contacts a radially directed rod flexurally affixed to a lever; so that, as the lever is pressed against a projecting flange of the holder tube, the tube is translated axially forward.

15 Claims, 3 Drawing Sheets

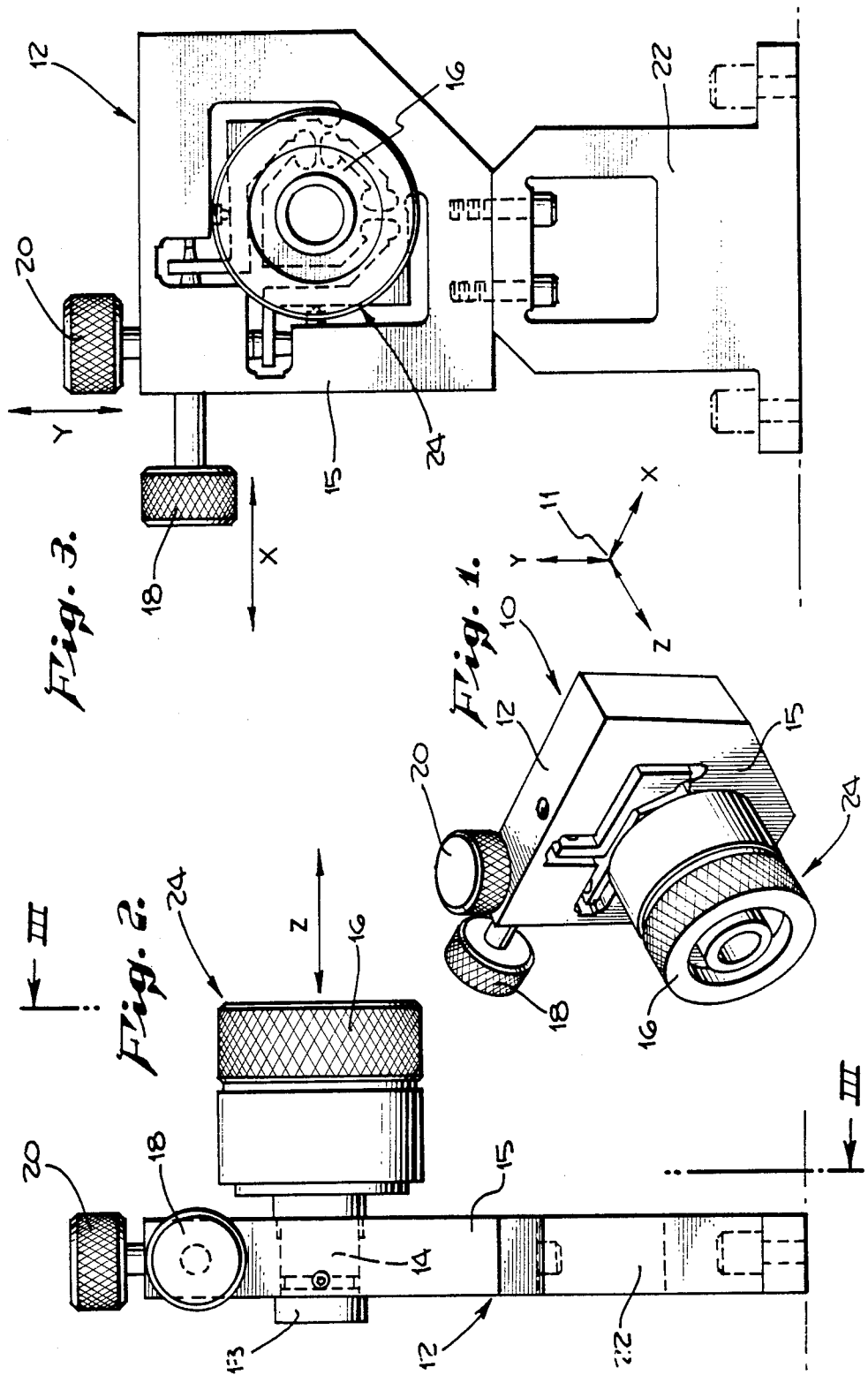

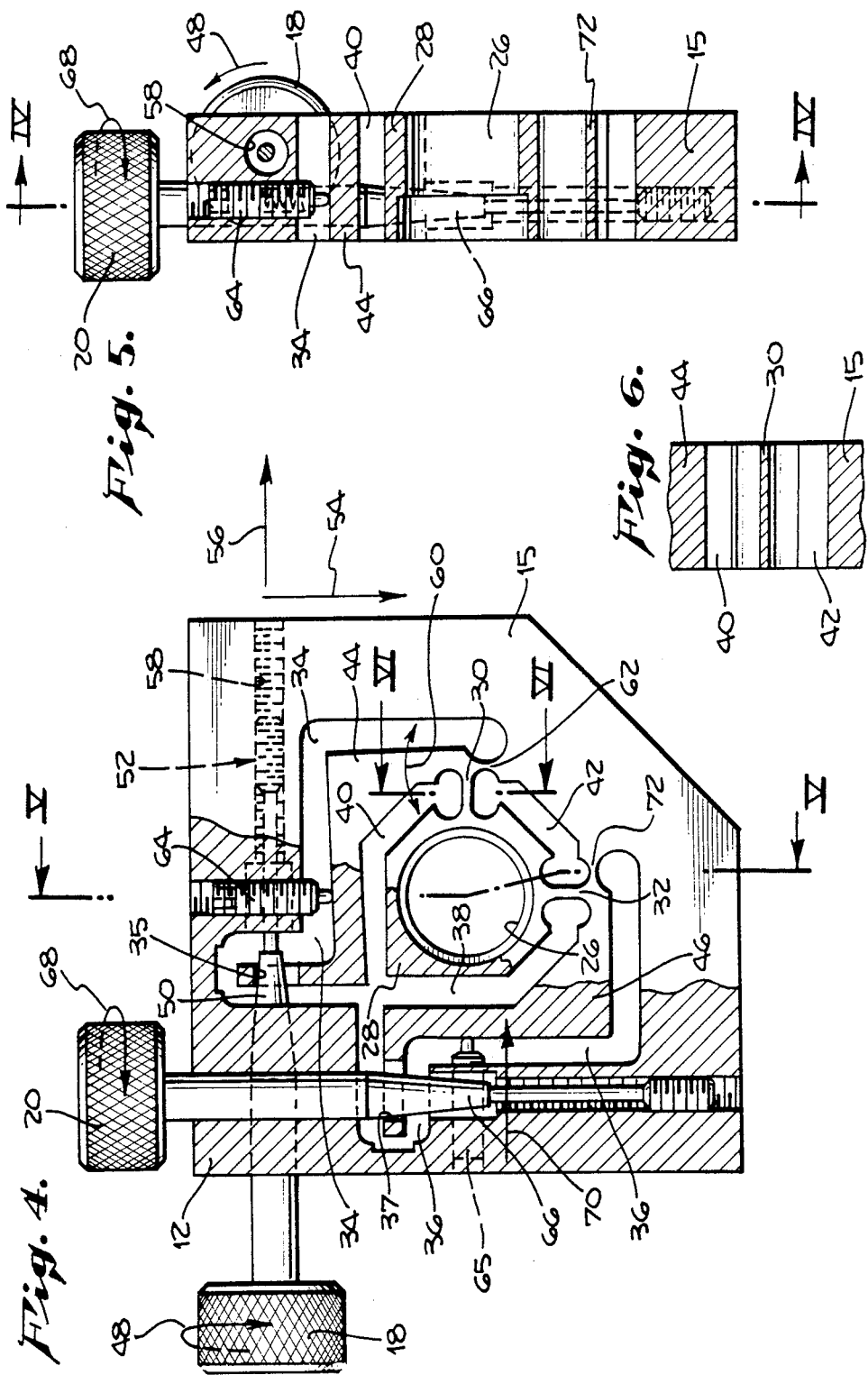

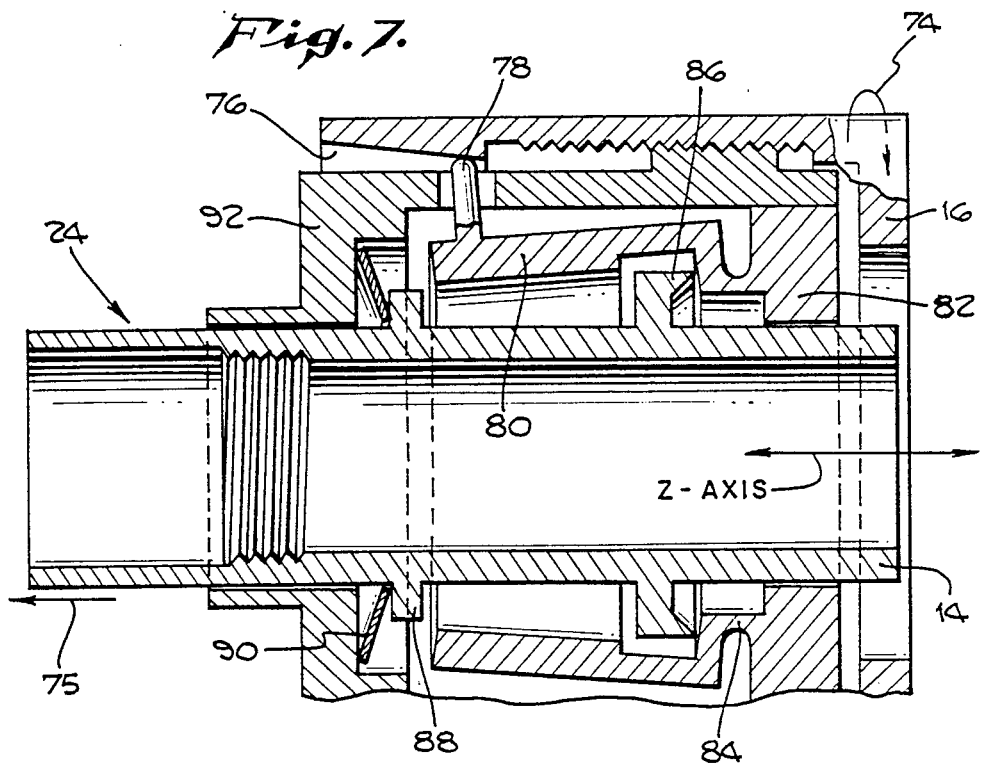
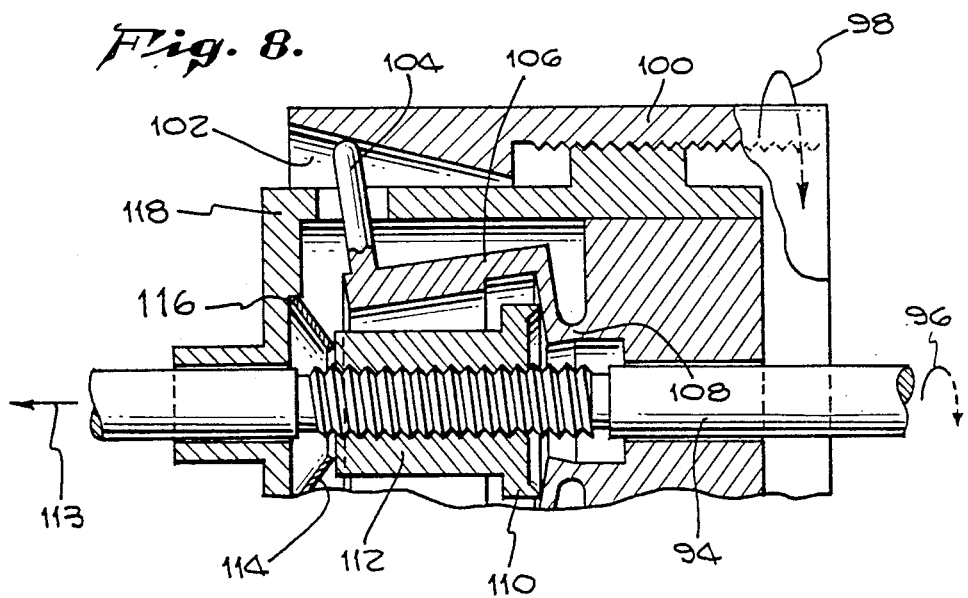

MULTI-DIMENSIONAL NANOMETRIC DISPLACEMENT POSITIONER

FIELD OF INVENTION

This invention relates to finely adjustable positioners, and more particularly, to a finely adjustable positioner capable of minute, nanometric adjustments in each of three dimensions.

BACKGROUND OF THE INVENTION

Standards for scientific and industrial equipment have specified ever finer and more accurate component positioning alignments within narrow ranges. Particularly, optical and laser equipment require small displacement capabilities.

Adjustable mirror mounts and X, Y, Z positioners have been used in optical bench elements which were designed to achieve selective and fine movements. In such X, Y, Z positioner designs, three finely pitched micrometric screws drove three sliding or rolling carriages. These carriages and their respective drive screws are structurally interconnected into a three dimensional displacement drive assembly. Spring loading of such interconnected elements is used to eliminate play in the carriage ways; however, undesirable cumulative error displacements seriously interfere with the operation of the positioner assembly in the micrometric range. As optics and fiber optics applications have increased, design demands have dictated optical work benches capable of extremely small displacements, down into the ranges of wavelengths of the light spectrum. The more minute the desired displacement, the greater tha naturally occurring effect of cumulative error resulting from carriage play and the spring loading of interconnected assembly elements.

Previous attempts at addressing the problems of cumulative error and mechanical backlash include adjustable mirror mount devices employing flexure pin hinges for adjusting two angles to achieve substantially reduced backlash. Flexure pins used as low backlash hinges for small angular displacements are featured in Laser and Fabry Perot cavity alignment structures. Flexure pivot principle based devices include the "Micro Positioning Base" manufactured by Newport Corporation (NRC); and, one dimensional flexure pivot stages assembled by Physitec (catalog numbers 42-1050 and 42-1055).

U.S. Pat. No. 4,139,948 issued to Tsuchiya discloses a micromanipulator based on the principle of the differential lever, wherein a fine displacement is achieved by the interaction of two separate micrometers 36 and 38 (FIG. 1) to produce an accuracy of 0.1 to 0.2 micron Linear Movement. Such a device was used to align the core ends of optical fibers.

U.S. Pat. No. 4,331,384 to Eisler is directed to an optomechanical system, built up of basic elements with a number of orthogonal degrees of freedom. This system claims to achieve three degrees of freedom down to a resolution in each of three directions of 0.2 micrometers; the overall displacement in the interferometrical range equal a movement which is achieved by a separate assembly in each direction of movement. A lever mechanism with a high transmission ratio through a differential and standard micrometer screw is used to achieve this fine resolution, and is discussed in U.S. Pat. No. 4,209,233, also to Eisler.

As industry standards and optics requirements have evolved, interferometrical resolution and accuracy is affected both by the inherent backlash in each orthogonal degree of freedom as well as cross-talk between the independent elements, where each element controls movement in a separate direction and degree. While problems like backlash and cross-talk have not been overwhelming in the micrometric ranges of displacement, these problems are of greater moment in the nanometric ranges which include optical resolutions of the order of magnitude of the wave length of light. Therefore, there is a need for a more precise and sensitive optical positioner or bench tool which is capable of accurate operation in more precise measurements and ranges.

SUMMARY OF THE INVENTION

The invention disclosed herein is directed to a multi-dimensional fine-adjustment linear nanometric displacement apparatus including a monolithic housing having a main frame portion and defining a support ring with a centrally positioned aperture. The support ring is movable with respect to the main frame portion. Also defined within the monolithic housing is a pair of rigid levers, each forming flexural connections with the support ring, each connection located about the circumference of the support ring and each lying respectively, along the X- and Y- axes.

Each of the rigid levers is linked to a flexure link which connects to the centrally positioned support ring. Each of the flexure links and rigid levers are joined at a flexure fulcrum. The lever is significantly longer than the flexure link, so that as the rigid lever is moved, a substantial reduction ratio results and the support ring moves a nanometric displaced distance along either the X- or Y- axes.

A manual knob provides a means for driving each lever separately against the support ring, moving the ring only in a single line of action or dimension with little backlash or cross talk between X- and Y- axis movement. By being integral with the monolithic housing, each lever provides separate nanometric displacement through principles of a compound lever. The manual knob controls a finely pitched tapered screw which drives the rigid lever.

Mounted within the support ring is an elongated tubular adjustment mechanism projecting outward from the center of the monolithic housing in the Z- axis dimension, orthogonal to both the first and second linear dimensions.

The tubular adjustment mechanism includes an inner holder tube having at least one projecting member forming an outward radially directed flange along the outer surface of this inner holder tube. An adjustment body tube surrounds the inner holder tube and forms a flexure lever which is flexually linked to the body tube, such that the flexure lever is biased against the flange projecting outward from the inner holder tube. An outer drive sleeve is capable of manual control and has an inner surface tapered bore contacting a radially directed rod affixed to the lever, so that the lever bends at its flexure fulcrum as the rod is contacted by the bore of the sleeve. The lever then presses against the flange of the inner holder tube, causing the holder tube to move axially in a direction opposite the axial direction of movement of the outer driving tube, whereby nanometric displacement of the tubular adjustment mechanism proceeds along the third linear dimension.

In an alternative embodiment a central shaft is threaded into a nut which rides on the shaft. The nut has an axial forward projecting member pressed against the flexure lever and a shoulder flange positioned rearward on the nut against the biasing Belleville spring.

BRIEF DESCRIPTION OF THE DRAWINGS

FIG. 1 shows a perspective view of the multidimensional nanometric displacement positioner of this invention.

FIG. 2 shows a side elevational view of the multidimensional nanometric displacement positioner of this invention supported upright by an elevational support member 22.

FIG. 3 shows a front elevational view of the multidimensional nanometric displacement positioner, taken along line III—III of FIG. 2.

FIG. 4 shows a cross-sectional view of the monolithic housing of the X- axis and Y- axis displacement positioner of this invention.

FIG. 5 shows a cross-sectional view of the preferred embodiment of the X- axis and Y- axis displacement positioner of this invention taken along line V—V of FIG. 4.

FIG. 6 shows a cross-section view of the X-axis and Y-axis displacement positioner taken across the X-axis showing a cross-section of flexure link 30.

FIG. 7 shows a cross-sectional view of the preferred embodiment of the Z- axis tubular adjustment mechanism of this invention.

FIG. 8 shows a partial cross-sectional view of an alternative embodiment of a Z- axis movable adjustment mechanism for this invention.

DETAILED DESCRIPTION OF THE PREFERRED EMBODIMENT

With reference to FIGS. 1, 2, and 3, there is shown generally a multi-dimensional nanometric displacement positioner 10 and a graphic representation 11 of the orthogonal directions of movement X-Y-Z. A monolithic housing 12 securely mounts an optical fiber holder tube 14 which is surrounded by an internally threaded control sleeve 16 to control Z-axis movement. The monolithic housing 12 has a main frame portion 15 which surrounds the region of the housing 12 which supports and mounts the holder tube 14. The optical fiber holder tube 14 may also be moved in the X and Y-axis by manual manipulation and control of the x-axis control knob 18 and the y-axis control knob 20. The monolithic housing 12 may be seated directly on a work bench but may also be supported by an elevational support member 22 (FIGS. 2 and 3). The tubular adjustment mechanism and assembly 24 may be secured to the monolithic housing 12 by a securing screw 13 fastened to the rear side (FIG. 2) holding the tube 14 to the housing 12. As mounted in place, the holder tube 14 may thereby be linearly repositioned in the X- and Y-axis in nanometric displacements by manipulations of the control knobs 18 and 20, while adjustments to the control sleeve 16 are made for Z- axis movement.

A greater detailed view of X- and Y- axis movement is shown by referring to FIGS. 3 and 4. The monolithic housing 12 is shown with the holder tube 14 removed to reveal the manner in which the control knobs 18 and 20 may control X- and Y- directional displacement of the tube receiving support ring 28. The support ring 28 has a central aperture 26 which holds and supports the optical fiber holder tube 14 (FIG. 1) when the tube 14 is inserted into ring 28. The support ring 28 is supported and linked to the rest of the monolithic housing 12 across a flexure link 30 for X- axis movement and to a flexure link 32 for Y-axis movement. The support ring 28 is capable of movement about the flexure links 30 and 32. The links 30 and 32 allow the support ring 28 to be movable with respect to the frame portion 15. Cut and formed into the monolithic body 12 are a series of channels 34, 36, 38, 40, and 42 which define the zig-zag, double L-shaped arms 44 and 46 which act as rigid levers to multiply the reduction of displacement necessary to move the support ring 28 in the nanometric range. For example, an analysis of the operation of the X-axis control knob 18 causing the support ring 28 to move will illustrate the principles of X- and Y- axis movement of this invention in the nanometric range.

As the control knob 18 is turned in a clockwise 48 direction, the tapered shaft 50 controlled by knob 18 turns within a finely pitched thread and screw assembly 52. As the thread and screw assembly 52 is turned together with the tapered shaft 50 by manipulation of the control knob 18, the upper portion of the large hole 35 rides on the tapered shaft 50 and causes arcuate movement 60 of the zig-zag arm 44 against the spring plunger 64. In this manner a compound zig-zag double L-shaped lever 44, in effect, has an effort applied by the tapered shaft 50 at the large hole 35 which gives rise to the displacement moment vector 54 and is transmitted down the double L-shaped arm 44 to a flexible fulcrum 62. The load (being the support ring 28 holding the adjustment mechanism 24) is positioned a short distance along the flexure link 30 from the flexible fulcrum 62. A spring plunger screw 64 piercing through the monolithic housing 12 assures that as the double L-shaped arm 44 is moved along its arc 60, the top portion of the large hole 35 remains in contact with the taper 50 once the position of the support ring 28 is shifted in an X-axis direction. It is the combination of the tapered shaft 50, moving against the hole 35 of the double L-shaped arm 44, and the lever action of the arm 44 itself, acting on flexible fulcrum 62, and the close proximity of the second flexible fulcrum 30 which provide the linear reduction of movement in the nanometric range.

In a similar manner, tapered control shaft 66 is turned in a clockwise direction 68, which imparts an orthogonal displacement moment 70 against the monolithic housing, causing the double L-shaped arm 46 to move the support ring 28 in the Y- axis direction by means of arcuate movement of the double L-shaped arm 46 about a flexible fulcrum 72. The fulcrum 72 is positioned at the end of the lever arm 46 which is moved by the tapered shaft 66 and the force of the spring plunger 65, which is positioned away from the fulcrum 72 along and above a flexure link 32.

In this manner, the compound lever of each double L-shaped arm 44 and 46, causes X and Y nanometric translation of the support ring 28 for positioning the optical fiber holder tube 14. Spring plungers 64 and 65 positioned against arms 44 and 46 assure positive contact between the large holes 35 and 37 and the tapered cones of the shafts 50 and 66. The particular geometric configuration of the channels (34, 36, 38, 40, and 42) of the monolithic housing 12 simplifies manufacture and assures that the levered system for moving the support ring 28 in an X- and Y- axis direction is relatively backlash free and has relatively little cross talk occurring between X-axis and Y-axis movement. In other words, once a position is set by the X- axis position knob 18, e.g., there is relatively little subsequent shifting of the supporting ring 28 out of its newly designed X- axis position, due to the backlash free nature of the channel configuration of the monolithic housing 12. While the first models were constructed out of anodized aluminum which has a large thermal coefficient of expansion, preferably, the monolithic housing 12 should be made from a zero or low thermal coefficient of expansion material such as the nickel alloy sold under the trademark INVAR. Also, the increased rigidity of this alloy further reduces the cross talk arising from the manipulation of the Y-axis control knob 20, assuring that the X-axis and Y-axis movement do not interfere with each other. Thus, movement of the support ring 28 may be controlled one axis (X and Y) at a time, with the assurance that the precise nanometric positioning set for one axis will not be disturbed by a subsequent setting a movement along the other axis. Tests performed by the applicant indicates that a 10° turn of the X- axis positional knob 18, for example, results in displacement equal to the length of one fringe of a helium-neon laser light or 316 nanometers ($1.24 \times 10^{-5}$ inches or 0.0000124 inches) of the support ring 28 with respect to the main frame portion 15.

FIG. 5 is a cross-sectional view taken along line V—V of FIG. 4 to show the operation of the nanometric displacement mechanism of this invention in the X-axis direction. As the control knob 18 is turned clockwise 48 (from the user viewpoint), the upper portion of the holes 35 (FIG. 4) of the double L-shaped arm 44 (FIG. 4) rides the tapered shaft 50 (FIG. 4), causing movement of the arm 44 about the flexible fulcrum 62. As the arm 44 moves around the flexible fulcrum 62 (FIG. 4), the support ring 28 moves along the X-axis (as shown in FIGS. 1 and 3). Nanometric displacement is achieved by the compound nature of the lever formed by the arm 44 acting in combination with the tapered shaft 50 (FIG. 4). A spring plunger 64 acts against the large hole 35 in the arm 44 so that after the arm 44 moves, the arm 44 returns to its original position before the tapered shaft 50 was activated. A significant motion reduction is thus achieved by the displacement mechanism with almost no backlash. FIG. 6 shows a cross-section highlighting the thin flexure link 30 which connects the arm 44 to the support ring 28. The flexure link 30 separates the channels 40 and 42 and provide a relatively strong but flexible link for the support ring 28 to the arm 44.

Turning to FIG. 7, there is shown a cross-sectional view of the preferred embodiment of the Z- axis adjustment mechanism 24. Manual turning of the internally threaded control sleeve 16 puts into motion a series of operations which insures the nanometric and precise movement of the optical fiber holder tube 14 in the Z-axis direction.

As the internally threaded control sleeve 16 is rotated in a clockwise direction, shown by the arrow 74, the tapered bore 76 at the rearward end of the sleeve 16 is pressed in contact against the round-headed drive pin 78 positioned radially outward from the sectioned lever arm 80 of the flexure lever. The lever arm 80 is linked to the flex pivot lever body 82 through a flexure fulcrum 84. As the lever arm 80 is caused to swing downward around the flexure fulcrum 84, the projection flange 86 of the optical fiber holder tube 14 rides along the lever arm 80 against the arm's inner shoulder. The optical fiber holder tube 14 then moves to the left direction 75 by a infinitesimal amount. At the same time the projection flange 86 causes the optical fiber tube holder 14 to move to the left direction 75, the radially directed shoulder flange 88 presses against the Belleville spring 90 which engages the inside of the adjustment body tube 92. Thus, movement of the projection flange 86 simultaneously causes compression of the Belleville spring 90 against the inner shoulder of the adjustment body tube 92. The Belleville spring 90 acts to bias the tube 14 in an axial direction opposite direction 75, so as to minimize backlash as the tube 14 nanometrically advantages along the Z- axis to the left direction 75. In this manner, backlash free Z- axis Nanometric displacement is achieved.

With reference to FIG. 8, an alternative embodiment of the Z- axis Nanometric displacement mechanism as shown in FIG. 7 is illustrated. As an alternative to an optical fiber holder tube 14 of FIG. 7, nanometric displacement along a Z- axis is achieved by movement of screw 94. Coarse adjustment of the screw 94 may be achieved by clockwise directional turning of the screw as shown in 96. Fine adjustment is achieved by clockwise 98 turning of the internally thread sleeve 100. A tapered bore 102 moves against a round headed pin 104 causing displacement of a lever arm 106 which reciprocally swings about a flex fulcrum 108. This flex fulcrum 108 presses the lever arm 106 against the projection 110 of the threaded nut 112, driving the threaded nut 112 in a leftward direction 113, compressing the Belleville spring 114 against an inner shoulder 116 of the tubular body 118. In this manner a nanometric displacement of the screw 94 is achieved. The nanometric screw 94 could then be mechanically linked to an optical fiber holder tube like 14 in FIG. 7, to achieve nanometric Z-axis displacement for the multidimensional nanometric displacement positioner such as that shown at 10 in FIG. 1.

While the preferred embodiment of the invention is disclosed herein, the scope of the invention is not necessarily limited to the preferred embodiment. Changes are possible and these changes are intended to be within the scope of the disclosure. For example, the particular configuration of the channels formed into the monolithic housing 12 which were chosen to facilitate manufacture may be varied without a substantial change in the principles which govern the operation of the nanometric positioner of this invention. Consequently, the specific configuration of the invention disclosed herein, or the construction of the nanometric position are merely representative, and are deemed to afford the best embodiment for purposes of disclosure and for providing support for the claims which define the scope of the present invention.

What is claimed is:

1. A multi-dimensional fine-adjustment linear displacement apparatus, comprising:
    a monolithic housing having a main frame portion, and a support ring movable with respect to said frame portion, said support ring having a central aperture,
    said monolithic housing further including:
    at least one first lever forming a flexural connection with said support ring, said lever being integral with said housing; and
    means for driving said first lever about said flexural connection including a tapered control shaft for displacing an arm of said first lever, and a spring plunger so as to nanometrically displace said support ring along a first linear dimension relative to said frame portion, substantially without backlash.

2. The apparatus of claim 1, including:
a second lever forming a flexural link to said support ring along the line of a second linear dimension substantially orthogonal to said first linear dimension, said second lever being integral with said housing; and
means for driving said second lever about said flexural link including:
a second tapered control shaft for actuating said second lever so that said support ring is nanometrically displaced, substantially without backlash along a second linear dimension, substantially without crosstalk with said first linear dimension, and
a second spring plunger operatively connected to said second lever.

3. A multi-dimensional fine-adjustment linear displacement apparatus comprising:
a monolithic housing including:
a main frame portion;
a support ring movable with respect to said frame portion, said support ring having a central aperture
at least one first lever forming a flexural connection with said support ring, said first lever being integrally formed from said housing;
means for driving said first lever about said flexural connection with said support ring, such that said support ring is nanometrically displaced, backlash free, along a first linear dimension relative to said frame portion;
a second lever forming a flexural link to said ring along the line a second linear dimension substantially orthogonal to said first linear dimension; said second lever being integral with said housing; and
means for driving said second lever about said flexural link so that said support ring is nanometrically displaced, backlash free, along a second linear dimension, substantially without crosstalk with said first linear dimension;
an elongated tubular adjustment mechanism, mounted without said support ring, and projecting outward from said monolithic housing along a central axis lying a third linear dimension orthogonal to said first and second linear dimensions;
said tubular adjustment mechanism further comprising:
an inner holder tube having at least one projecting member forming an outward radially-directed flange along the outer surface of said inner holder tube;
an adjustment body tube surrounding said inner holder tube, said adjustment body tube forming a flexure lever flexurally linked to said body tube, said flexure lever being biased against said flange of said inner holder tube; and
an outer driving control sleeve having conically tapered inner bore means for flexing said flexure lever against said flange of said inner holder tube;
whereby said outer driving control sleeve can be activated to control the linear displacement of said inner holder tube along said third linear dimension.

4. The multi-dimensional fine-adjustment linear displacement apparatus of claim 3 wherein:
said first lever further comprises a radially outward directed drive pin and a first flexure arm; and
the periphery of said tapered inner bore of said outer driving control sleeve contacts said drive pin, and
said tapered inner bore is positioned within said outer drive control sleeve in a generally axial direction, causing said first flexure arm to swing downward as said drive pin is contacted, thereby
causing said inner holder tube to move axially in a direction opposite the axial direction of movement of said outer driving control sleeve,
whereby said tubular adjustment mechanism allows nanometric movement along said third linear dimension.

5. A multi-dimensional fine-adjustment linear displacement apparatus, comprising:
a substantially rectangular monolithic housing having an outer main frame and a central support ring,
said monolithic housing including at least one first rigid lever, juxtaposed between said main frame and said support ring,
said first rigid lever being integral with said housing and forming a flexural link with said support ring; and
means for driving said first rigid lever, said lever driving means being capable of nanometrically displacing said support ring with respect to said main frame in substantially one dimension in a first direction;
a tubular adjustment mechanism, secured orthogonally to said monolithic housing, comprising:
an adjustment body tube;
an optical holder tube, having a central axis, positioned coaxially within said adjustment body tube, said optical holder tube having an outwardly directed projection flange on the outer surface;
a flexure lever flexurally linked to said adjustment body tube, said flexure lever having a rod projecting radially outward, the rod when actuated causing said flexure lever to move against said projection flange of said optical holder tube;
an outer driving control sleeve surrounding said adjustment body tube, said sleeve having a tapered inner bore for actuating the rod so as to drive said flexure lever as the sleeve is rotated about said central axis of said optical tube, such that said optical tube is axially displaced along said control axis,
whereby nanometric displacement is achieved in a first direction along the plane of said monolithic housing and a second direction along the central axis of said optical tube.

6. The multi-dimensional fine adjustment linear displacement apparatus of claim 5, wherein said monolithic housing further includes:
a second rigid lever juxtaposed between said main frame and said support ring,
said second lever being integral with said housing and forming a flexural link with said support ring; and
means for driving said second lever so as to nanometrically displace said support ring with respect to said main frame in a direction substantially orthogonal to the first and second directions of movement.

7. The multi-dimensional fine-adjustment linear displacement apparatus of claim 5, wherein said flexural link formed between said support ring and said first rigid lever is a thin flat band of flexible metallic material integral with said housing.

8. The multi-dimensional fine-adjustment linear displacement apparatus of claim 5, wherein the means for driving said first rigid lever includes a finely threaded tapered shaft capable of rotational control.

9. The multi-dimensional fine-adjustment linear displacement apparatus of claim 5, wherein said optical holder tube has a radially directed shoulder flange, and,
   a Belleville Spring pressed against said shoulder flange and said adjustment body tube to bias said optical holder tube so that backlash is substantially reduced as said tube is nanometrically displaced along said second direction.

10. A multi-dimensional fine-adjustment linear displacement apparatus, comprising:
    a monolithic housing having an outer main frame portion and a central support ring defining an aperture;
    an elongated adjustment mechanism having a central axis, mounted in the aperture of said central support ring orthogonal to the plane of said housing, said elongated adjustment mechanism comprising:
    an elongated central screw having finely pitched threads on the outer surface of said screw;
    tubular means operatively associated with said screw for displacing said screw along the central axis;
    said tubular means having a forward, radially-directed, projecting member pointing in a first direction parallel to said central axis;
    a tubular adjustment body member surrounding said tubular means;
    said adjustment body member including a flexure lever
    having a radially outward directed rod member;
    an outer driving sleeve, surrounding said screw, said tubular means, and said adjustment body member, said sleeve having a tapered inner bore for driving said rod member to displace said flexure lever and said tubular means, thereby moving said screw nanometrically along the central axis opposite said first direction; and
    a compressible spring operatively connected to said screw and said adjustment body member for providing bias to reduce backlash as said central screw is displaced in said first direction.

11. The multi-dimensional fine-adjustment linear displacement apparatus of claim 10, wherein said tubular means for displacing said screw comprises a threaded nut operatively cooperating with said screw.

12. The multi-dimensional fine-adjustment linear displacement apparatus of claim 10, wherein said tubular means for displacing said screw is integral with said screw.

13. The multi-dimensional fine-adjustment linear displacement apparatus of claim 12, where said monolithic housing further includes:
    a rigid first lever integral with said housing and forming a flexural link with said support ring;
    means for driving said first lever capable of nanometrically displacing said suppport ring with respect to said outer main frame portion of said housing in a second direction lying in the plane of the housing and orthogonal to said first direction.

14. The multi-dimensional fine-adjustment linear displacement apparatus of claim 13, wherein said rigid first lever is a zig-zag double L-shaped arm defined by channels cut in said monolithic housing.

15. The multi-dimensional fine-adjustment linear displacement apparatus of claim 13, including:
    a rigid second lever integral with said housing and forming a second flexural link with said support ring;
    means for driving said second lever to nanometrically displace said support ring with respect to said outer main frame portion of said housing in a third direction orthogonal to said first and second direction, said second lever positioned with respect to said first lever so that no cross-talk is introduced to said first lever and said support ring.

* * * * *

UNITED STATES PATENT AND TRADEMARK OFFICE
CERTIFICATE OF CORRECTION

PATENT NO. : 4,767,188
DATED : August 30, 1988
INVENTOR(S) : Jon H. Myer

It is certified that error appears in the above—identified patent and that said Letters Patent is hereby corrected as shown below:

Col. 1, Section [21], "Appl. No. 056,556" instead of "Appl. No. 56,556."

Signed and Sealed this

Seventeenth Day of January, 1989

Attest:

DONALD J. QUIGG

*Attesting Officer*      *Commissioner of Patents and Trademarks*